United States Patent Office
3,027,383
Patented Mar. 27, 1962
3,027,383
16-HALO STEROIDS
Donald E. Ayer, Kalamazoo, and William P. Schneider, Kalamazoo Township, Kalamazoo County, Mich.
No Drawing. Filed Jan. 11, 1960, Ser. No. 1,419
20 Claims. (Cl. 260—397.1)
This invention relates to certain novel 16-halo steroids and to a process for their production which can be represented by the following structural formulae:
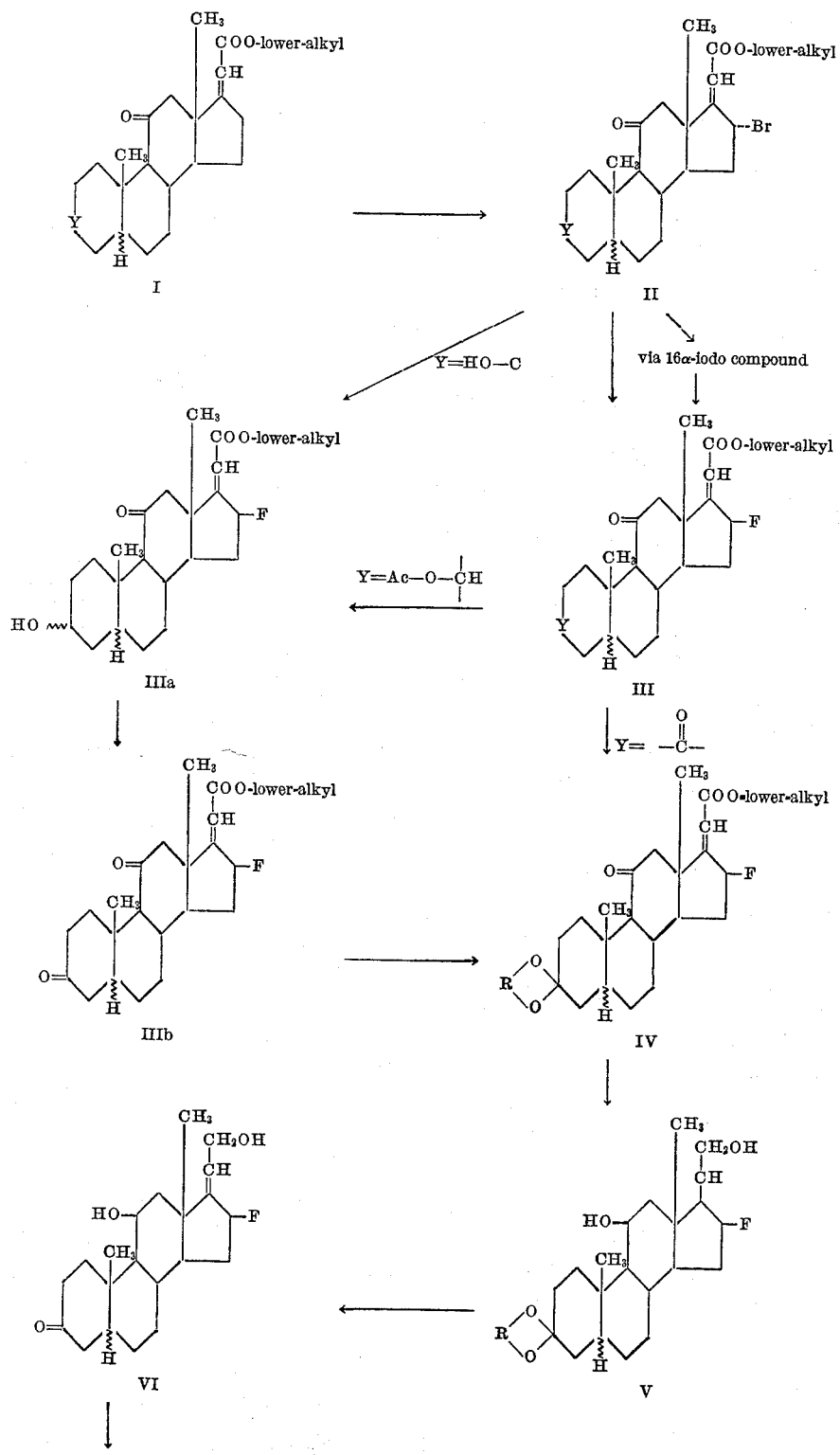

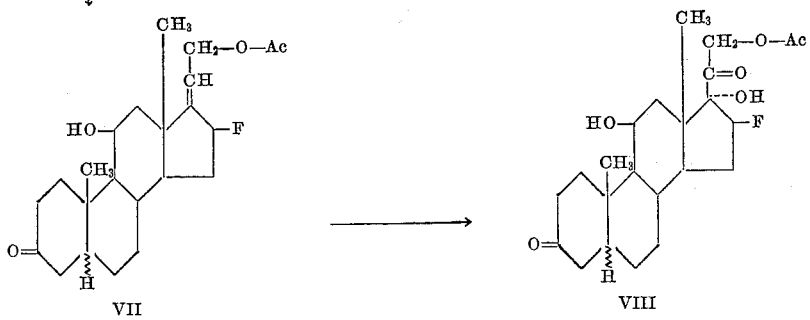

wherein Y is carbonyl, hydroxymethylene, or hydrocarbonacyloxymethylene, e.g., lower-hydrocarbonacyloxymethylene containing from 1 to 12 carbon atoms, inclusive, in the acyl radical; R is lower-alkylene, e.g., containing from 2 to 8 carbon atoms, inclusive, and containing from 2 to 3 carbon atoms in the oxygen to oxygen chain; Ac is the acyl radical of a hydrocarbon carboxylic acid, e.g., containing from 1 to 12 carbon atoms, inclusive, and lower-alkyl means containing from 1 to 8 carbon atoms, inclusive. The wavy line at the 5-position is a generic expression which includes both the 5β (normal) and 5α (allo) isomers.

The compounds represented by Formulae I, II and III, wherein Y is hydroxymethylene or hydrocarbonacyloxymethylene, and IIIa ordinarily have a stereoconfiguration at the 5 position which is opposite that of the configuration of the 3-substituent, e.g., 3β-hydroxy-5α and 3α-hydroxy-5β. The stereoconfigurtion of the side chain of Compounds I–VII is preferably cis, although the corresponding trans isomers can also be employed in the reactions described herein and are part of this invention. The trans isomers of the compounds represented by Formula I can be prepared by refluxing the corresponding cis isomers in a lower-alkanol containing an alkali-metal alkoxide, e.g., sodium methoxide in methanol.

The compounds and process of this invention are useful in the production of 21-esters of 16β-fluorohydrocortisone, 16β-fluoroprednisolone and corresponding 9α,16β-difluoro compounds. These compounds possess glucocorticoid, antiinflammatory and mineralocorticoid activity as well as ACTH inhibiting, diuretic, CNS-regulating and progestational activity. They can be administered to the animal organism, e.g., man, as well as birds and mammals, in the same fashion and in the same pharmaceutical forms as have been employed in the use of hydrocortisone and hydrocortisone acetate, e.g., tablets, elixirs, solutions, suspensions, creams, and ointments.

The process of this invention comprises the step of reacting a 16α-bromo compound represented by Formula II, or the corresponding 16α-iodo compound, with a heavy metal fluoride, i.e., those metals having insoluble bromides, e.g., copper, palladium, silver, platinum, gold, mercury, thallium and lead.

The 3-hydrocarbonacyloxymethylene-16β-fluoro compounds of this invention

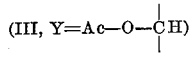

can also be prepared from the corresponding 3-hydroxy compounds (IIIa) by esterification of the 3-hydroxy group according to procedures well known in the art, e.g., with the selected acid anhydride in pyridine. Similarly, the 3-hydroxy compounds (IIIa) can be prepared from the corresponding 3-hydrocarbonacyloxy compound by an ester exchange reaction involving the latter compound, e.g., with boron trifluoride and methanol in the manner shown in Example 3. Oxidation of a 3-hydroxy compound (IIIa) with, e.g., chromic acid or with a N-haloamide or N-haloimide in pyridine, is productive of the corresponding 3-keto compound (IIIb).

The novel 16α-bromo starting compounds for the process of this invention (II) can be prepared by brominating, when Y is carbonyl or hydrocarbonacyloxymethylene, the corresponding 16-substituted compounds (I) with an N-bromoamide or N-bromoimide, e.g., N-bromoacetamide, N-bromosuccinimide, 1,3-dibromo-5,5-dimethylhydantoin, desirably with concomitant irradiation of the reaction mixture with actinic, e.g., ultraviolet, light. Surprisingly, a good yield of the desired product can be obtained when Y is carbonyl, although the 2 and/or 4 positions are also susceptible to bromination.

The 16α-bromo starting compounds (II) wherein Y is hydroxymethylene can also be prepared from the corresponding compounds wherein Y is hydrocarbonacyloxymethylene by removal of the ester group, e.g., hydrolysis or preferably ester exchange reaction with methanol or ethanol and boron trifluoride as the catalyst.

The 16α-bromo starting compounds wherein Y is carbonyl can also be prepared by oxidation of the corresponding compound wherein Y is hydroxymethylene, e.g., with chromic acid or chromic oxide in sulfuric acid.

The compounds represented by Formula I are known in the art. See, for example, U.S. Patent 2,752,366.

The 16β-fluoro compounds of this invention are converted to 11β,17α,21-trihydroxy - 16β - fluoro-4-pregnene-3,20 - dione, 11β,17α,21 - trihydroxy - 16β - fluoro-1,4-pregnadiene-3,20-dione and their 21-esters by the following reactions: a 3,11-diketo-16β-fluoro-17(20)-pregnen-21-oic acid lower-alkyl ester (IIIb) is ketalized with a lower-alkyl α- or β- glycol under the usual reaction conditions, e.g., acid catalyst in refluxing solvent with azeotropic removal of the water of reaction, to produce the corresponding 3-cyclic ketal (IV). This ketal is then reduced with a chemical reducing agent capable of reducing an ester group to an alcohol, e.g., lithium aluminum hydride, lithium mono methoxy aluminum hydride, sodium aluminum hydride, to produce the corresponding 3-ketal of 11β,21 - dihydroxy - 16β - fluoro - 17(20) - pregnen - 3-one (V). Hydrolysis of the 3-ketal group, e.g., with dilute aqueous mineral acid in a lower-alkanol followed by conventional 21-acylation, produces the free 3-keto compound (VII). Oxidative hydroxylation of this compound with osmium tetroxide and another oxidizing agent which contributes an oxygen atom to the reaction, e.g., hydrogen peroxide, an amine oxide peroxide, an aryliodo oxide, alkyl peroxide or peracid, produces an 11β,17α,21-trihydroxy-16β-fluoropregnane-3,20-dione 21-acylate (VIII). These compounds can be dehydrogenated chemically or microbiologically according to procedures known in the art, e.g., with selenium dioxide, corynebacterium, Septomyxa affinis, or mono or dihalogenated with bromine or an N-bromoamide or N-bromoimide and then dehydrobrominated with base, e.g., pyridine, to produce the corresponding Δ⁴ and Δ¹,⁴ compounds, i.e., 11β,17α,21-trihydroxy - 16β - fluoro-4-pregnene-3,20-dione 21-acylate and 11β,17α,21-trihydroxy-16β-fluoro-1,4 - pregnadiene - 3,20- dione 21-acylate. Ester exchange reactions of these compounds with methanol or ethanol in the presence of boron trifluoride as catalyst are productive of the corresponding 21-hydroxy compounds. Alternatively, a 9α-fluoro group can be introduced into these compounds by the usual steps of dehydration of the 11β-hydroxy group, introduction of a 9α-bromo-11β-hydroxy group with hypobromous acid, reaction with potassium acetate to produce the 9β,11β-oxido group and then reaction with hydrogen fluoride to produce the 9α-fluoro-11β-hydroxy compounds which, like the corresponding 9-hydrogen compounds, possess marked anti-inflammatory, glucocorticoid and mineralocorticoid activity.

PREPARATION 1

*3α-Hydroxy-11-Keto-5β-Pregn-17(20)-[cis]-en-21-oic Acid Methyl Ester 3-Acetate*

2.0 g. of 3α-hydroxy-11-keto-5β-pregn-17(20)-[cis]-en-21-oic acid methyl ester (U.S. Patent 2,752,366) was acetylated with 15 ml. of acetic anhydride and 15 ml. of pyridine at room temperature overnight. The mixture was poured into ice water and the precipitated steroid extracted with methylene chloride. The extracts were washed with water, dilute hydrochloric acid, aqueous sodium bicarbonate, water and dried. Evaporation left a residue of 3β-hydroxy-11-keto-5β-pregn-17(20)-[cis]-en-21-oic acid methyl ester 3-acetate which when, crystallized from hexanes, melted at 108°–111° C.

PREPARATION 2

*3β-Hydroxy-11-Keto-5α-Pregn-17(20)-[cis]-en-21-oic Acid Methyl Ester*

Following the procedure of U.S. Patent 2,752,366, 3β-hydroxy-5α-pregnane-11,20-dione [Cameron et al., J. Chem. Soc., 3864 (1953)] was converted by the steps of glyoxalating with sodium methoxide and ethyl oxalate in tertiary butyl alcohol, dibrominating with about two molar equivalents of bromine in the presence of potassium acetate, and rearranging with sodium methoxide in methanol to 3β-hydroxy-11-keto-5α-pregn-17(20)-[cis]-en-21-oic acid methyl ester which when crystallized from ethyl acetate melts at 188–190° C.

PREPARATION 3

*3β-Hydroxy-11-Keto-5α-Pregn-17(20)-[cis]-en-21-oic Acid Methyl Ester 3-Acetate*

Following the procedure of Preparation 1, 3β-hydroxy-11-keto-5α-pregn-17(20)-[cis]-en-21-oic acid methyl ester was acetylated to give 3β-hydroxy-11-keto-5α-pregn-17(20)-[cis]-en-21-oic acid methyl ester 3-acetate which, when crystallized from hexanes, melted at 143–145° C.

PREPARATION 4

*3,11-Diketo-5β-Pregn-17(20)-[cis]-en-21-oic Acid Methyl Ester*

To a solution of 3.0 g. of 3α-hydroxy-11-keto-5β-pregn-17(20)-[cis]-en-21-oic acid methyl ester in 400 ml. of acetone at 10° C. was added 2.4 ml. of 4 N chromic acid in aqueous sulfuric acid. The mixture was stirred for 5 minutes and then poured into 2 l. of ice water. The precipitated 3,11-diketo-5β-pregn-17(20)-[cis]-en-21-oic acid methyl ester was collected and dried at reduced pressure to give 2.7 g. of crystals thereof melting at 213–220° C. An analytical sample melting at 213–214° C. was obtained by crystallization from a mixture of acetone and hexanes.

Following the procedure of Preparation 4 exactly, but substituting 3β-hydroxy-11-keto-5α-pregn-17(20)-[cis]-en-21-oic acid methyl ester as the starting compound, there is thus produced 3,11-diketo-5α-pregn-17(20)-[cis]-en-21-oic acid methyl ester.

EXAMPLE 1

*3β-Hydroxy-11-Keto-16α-Bromo-5α-Pregn-17(20)-[cis]-en-21-oic Acid Methyl Ester 3-Acetate*

To a stirred solution of 2.8 g. of 3β-hydroxy-11-keto-5α-pregn-17(20)-[cis]-en-21-oic acid methyl ester 3-acetate in 100 ml. of boiling carbon tetrachloride in a glass flask transparent to ultraviolet light was added 1.31 g. of N-bromosuccinimide. The mixture was irradiated with ultraviolet light for 10 minutes and then chilled to 10° C. The precipitated succinimide was separated by filtration and the filtrate evaporated to dryness. The residual 3β-hydroxy-11-keto-16α-bromo-5α-pregn-17(20)-[cis]-en-21-oic acid methyl ester 3-acetate was crystallized from a mixture of acetone and hexanes to give 2.75 g. of crystals melting at 195–197° C. Two recrystallizations from a mixture of acetonitrile and water gave an analytical sample melting at 197–200° C.

Following the procedure of Example 1, other lower-alkyl ester 3-acylates of 3β-hydroxy-11-keto-5α-pregn-17(20)-[cis]-en-21-oic acid, e.g., methyl ester 3-propionate, methyl ester 3-octanoate, ethyl ester 3-acetate, ethyl ester 3-propionate, ethyl ester 3-octanoate, are brominated to produce the corresponding 16α-bromo compounds.

EXAMPLE 2

*3α-Hydroxy-11-Keto-16α-Bromo-5β-Pregn-17(20)-[cis]-en-21-oic Acid Methyl Ester 3-Acetate*

Following the procedure of Example 1, 1.4 g. of 3α-hydroxy-11-keto-5β-pregn-17(20)-[cis]-en-21-oic acid methyl ester 3-acetate in 50 m. of carbon tetrachloride was converted with 0.66 g. of N-bromosuccinimide to 3α-hydroxy-11-keto-16α-bromo-5β-pregn-17(20)-[cis]-en-21-oic acid methyl ester 3-acetate. One crystallization from hexanes gave 1.037 g. of crystals thereof melting at 235–238° C. A second crystallization from a mixture of acetone and hexanes and two more from a mixture of acetonitrile and water dropped the melting point of the analytically pure sample thus obtained to 225–229° C., λ max. 226 mμ, E=8050, with a flex at 242 mμ, E=7250. Infrared absorption bands (Nujol) were present at 1735, 1705, 1663, and 870 cm.$^{-1}$.

Following the procedure of Example 2, other lower-alkyl ester 3-acylates of 3α-hydroxy-11-keto-5β-pregn-17(20)-[cis]-en-21-oic acid, e.g., methyl ester 3-propionate, methyl ester 3-octanoate, ethyl ester 3-acetate, ethyl ester 3-propionate, ethyl ester 3-octanoate, are brominated to produce the corresponding 16α-bromo compounds.

EXAMPLE 3

*3α-Hydroxy-11-Keto-16α-Bromo-5β-Pregn-17(20)-[cis]-en-21-oic Acid Methyl Ester*

A solution of 0.4 g. of 3α-hydroxy-11-keto-16α-bromo-5β-pregn-17(20)-[cis]-en-21-oic acid methyl ester 3-acetate and 1 ml. of boron trifluoride etherate in 25 ml. of methanol and 20 ml. of methylene chloride was maintained at room temperature for 18 hours. The solution was then concentrated at reduced pressure to 5 ml. and diluted with 125 ml. of ice-water. The resulting precipitate was collected and dried to give 0.313 g. of 3α-hydroxy-11-keto-16α-bromo-5β-pregn-17(20)-[cis]-en-21-oic acid methyl ester.

Following the procedure of Example 3, other lower-alkyl ester 3-acylates of 3α-hydroxy-11-keto-16α-bromo-5β-pregn-17(20)-[cis]-en-21-oic acid and the lower-alkyl ester 3-acylates of 3β-hydroxy-11-keto-16α-bromo-5α-pregn-17(20)-[cis]-en-21-oic acid, e.g., methyl ester 3-propionate, methyl ester 3-octanoate, ethyl ester 3-acetate, methyl ester 3-propionate, ethyl ester 3-octanoate, are converted with boron trifluoride in methanol to the corresponding lower-alkyl ester of 3α-hydroxy-11-keto-16α-bromo-5β-pregn-17(20)-[cis]-en-21-oic acid and 3β-hydroxy-11-keto-16α-bromo-5α-pregn-17(20)-[cis]-en-21 acid, respectively.

EXAMPLE 4

3,11-Diketo-16α-Bromo-5β-Pregn-17(20)-[cis]-en-21-oic Acid Methyl Ester

A solution of the 0.313 g. of 3α-hydroxy-11-keto-16α-bromo-5β-pregn-17(20)-[cis]-en-21-oic acid methyl ester, obtained in the manner described in Example 3, in 25 ml. of acetone was cooled to 10° C. and 0.2 ml. of a chromic acid and sulfuric acid solution containing 1.1 mol. eq. of chromic acid, calculated on the steroid, was added. After 10 minutes the reaction mixture was poured into 200 ml. of ice water. The precipitate was collected, washed thoroughly with water and dried to give 0.264 g. of white product which, when crystallized from a mixture of acetone and hexanes gave 0.22 g. of 3,11-diketo-16α-bromo-5β-pregn-17(20)-[cis]-en-21-oic acid methyl ester in two crops melting at 207–209° C.

Following the procedure of Example 4, other loweralkyl esters of 3α-hydroxy-11-keto-16α-bromo-5β-pregn-17(20)-[cis]-en-21-oic acid and the lower-alkyl esters of 3β - hydroxy - 11- keto - 16α - bromo - 5α - pregn - 17(20)-[cis]-en-21-oic acid, e.g., the ethyl, propyl, butyl, or octyl ester, are converted to the corresponding loweralkyl ester of 3,11-diketo-16α-bromo-5β-pregn-17(20)-[cis]-en-21-oic acid and of 3,11-diketo-16α-bromo-5α-pregn-17(20)-[cis]-en-21-oic, respectively.

EXAMPLE 5

3,11-Diketo-16α-Bromo-5β-Pregn-17(20)-[cis]-en-21-oic Acid Methyl Ester

Following the procedure of Example 2 exactly, 1.4 g. of 3,11 - diketo - 5β - pregn - 17(20) - [cis] - en - 21 - oic acid methyl ester was brominated to give 3,11-diketo-16α-bromo-5β-pregn-17(20)-[cis]-en-21-oic acid methyl ester. One crystallization from a mixture of acetone and hexanes gave 0.856 g. of crystals thereof. Three crystallizations from the same solvent pair gave an analytical sample melting at 212–214° C., λ max. 227 mμ, E=7900 with a flex at 244 mμ, E=6800. The sample had infrared absorption bands (Nujol) at 1712, 1703, 1658 and 870 cm.$^{-1}$.

Following the procedure of Example 5, other loweralkyl esters of 3,11-diketo-5β-pregn-17(20)-[cis]-en-21-oic acid and the lower-alkyl esters of 3,11-diketo-5α-pregn-17(20)-[cis]-en-21-oic acid, e.g., ethyl, propyl, butyl, octyl, etc., are brominated to produce the corresponding lower-alkyl ester of 3,11-diketo-16α-bromo-5β-pregn-17(20)-oic acid and of 3,11-diketo-16α-bromo-5α-pregn-17(20)-[cis]-en-21-oic acid, respectively.

EXAMPLE 6

3β-Hydroxy-11-Keto-16β-Fluoro-5α-Pregn-17(20)-[cis]-en-21-oic Acid Methyl Ester 3-Acetate A solution of 5.9 g. of 3β-hydroxy-11-keto-16α-bromo-5α-pregn-17(20)-[cis]-en-21-oic acid methyl ester 3-acetate in 275 ml. of acetonitrile containing 16 g. of silver bifluoride (prepared from anhydrous hydrogen fluoride and excess silver oxide in acetonitrile) was heated under reflux for one hour. The mixture was cooled to room temperature, filtered and the filter cake washed with methylene chloride. The filtrate was evaporated at reduced pressure to a thick slurry which was partitioned between methylene chloride and water. The aqueous phase was separated and extracted with methylene chloride. The combined methylene chloride phases were washed once with water and dried. The solvent was removed, leaving a 4.96 g. residue which was crystallized twice from a 50:50 mixture of acetonitrile and water to give 3.49 g. of 3β - hydroxy - 11 - keto - 16β - fluoro - 5α - pregn - 17(20)-[cis]-en-21-oic acid methyl ester 3-acetate melting at 222–228° C. An analytically pure sample, obtained upon further crystallizations, melted at 235–235.5° C., had a λ max. 214 mμ, E=14,400 and infrared absorption (Nujol) bands at 1722, 1705, and 1665 cm.$^{-1}$.

EXAMPLE 7

3β-Hydroxy-11-Keto-16β-Fluoro-5α-Pregn-17(20)-[cis]-en-21-oic Acid Methyl Ester 3-Acetate (a) Following the procedure of Example 6, 0.5 g. of 3β - hydroxy - 11 - keto - 16α - bromo - 5α - pregn - 17(20)-[cis]-en-21-oic acid methyl ester 3-acetate in 50 ml. of acetonitrile was converted with 8 g. of a 50 percent aqueous silver fluoride solution during a two hour reflux period to 3β-hydroxy-11-keto-16β-fluoro-5α-pregn-17(20)-[cis]-en-21-oic acid methyl ester 3-acetate. One crystallization from a mixture of acetonitrile and water gave 0.324 g. of crystals thereof melting at 215–224° C.

(b) Similarly, 0.5 g. of the above-described starting material in 50 ml. of acetonitrile was converted with 5 g. of solid silver fluoride to the above-described reaction product. Work-up in the manner described above gave 0.278 g. of crystals thereof melting at 225-230° C.

(c) Similarly, a solution of 1.0 g. of the above-described starting material in 125 ml. of methylene chloride was refluxed for 19 hours in the presence of mercuric fluoride to give the above-described reaction product. Work-up in the manner described above gave 0.51 g. of crystals thereof melting at 228–229° C.

Following the procedure of Examples 6 and 7, other lower-alkyl ester 3-acylates of 3β-hydroxy-11-keto-16α-bromo - 5α - pregn - 17(20) - [cis]-en-21-oic acid and the lower-alkyl ester 3-acylates of 3α-hydroxy - 11 - keto-16α-bromo-5β-pregn-17(20)-[cis]-en-21-oic acid, e.g., the methyl ester 3-acetate, methyl ester 3-propionate, methyl ester 3-octanoate, ethyl ester 3-acetate, ethyl ester 3-propionate, ethyl ester 3-octanoate, are converted to the corresponding lower-alkyl ester 3-acylate of 3β-hydroxy-11-keto-16β-fluoro-5α-pregn-17(20)-[cis]-en-21 - oic acid and 3α - hydroxy - 11 - keto - 16β - fluoro - 5α - pregn-17(20)-[cis]-en-21-oic acid, respectively.

EXAMPLE 8

3,11-Diketo-16β-Fluoro-5β-Pregn-17(20)-[cis]-en-21-oic Acid Methyl Ester

A solution of 1.78 g. of 3,11-diketo-16α-bromo-5β-pregn-17(20)-[cis]-en-21-oic acid methyl ester in 160 ml. of acetonitrile containing 7.7 g. of silver bifluoride was refluxed for one hour and worked up in the manner described in Example 6 to give 1.43 g. of 3,11-diketo-16β-fluoro-5β-pregn-17(20)-[cis]-en-21-oic acid methyl ester. This compound was converted to its 3-ethylene ketal in the manner described hereinafter. The purified ketal was hydrolyzed with dilute sulfuric acid in acetone to give 3,11 - diketo - 16β - fluoro - 5β - pregn - 17(20) - [cis]-en-21-oic acid methyl ester which, when crystallized from a mixture of acetone and hexanes, melted at 158–159° C.

Following the procedure of Example 8, other lower-alkyl esters of 3,11-diketo-16α-bromo-5β-pregn-17(20)-[cis]-en-21-oic acid and the lower-alkyl esters of 3,11-diketo-16α-bromo-5α-pregn-17(20)-[cis]-en-21-oic acid, e.g., the methyl, ethyl, propyl, butyl, octyl ester, are converted to the corresponding lower-alkyl ester of 3,11-diketo-16β-fluoro-5β-pregn-17(20)-[cis]-en - 21 - oic acid and of 3,11-diketo-16β-fluoro-5α-pregn-17(20)-[cis]-en-21-oic acid, respectively.

EXAMPLE 9

3α-Hydroxy-11-Keto - 16β - Fluoro - 5β - Pregn - 17(20)-[cis]-en-21-oic Acid Methyl Ester 3-Acetate To 1.55 g. of 3α-hydroxy-11-keto-16α-bromo-5β-pregn-17(20)-[cis]-en-21-oic acid methyl ester 3-acetate in 50 ml. of boiling acetone was added 0.6 g. of sodium iodide in 6 ml. of acetone. The mixture was refluxed for 30 minutes with stirring, cooled and diluted with 500 ml. of water. The mixture was concentrated at reduced pressure to remove the acetone and then maintained overnight at 5° C. The resulting yellow precipitate was collected, washed with water and dried to give 1.66 g. of 3α-hydroxy-11-keto-16α-iodo-5β-pregn-17(20)-[cis]-en - 21 - oic acid methyl ester 3-acetate. One crystallization from a 50:50 mixture of acetonitrile and water gave 0.976 g. of crystals thereof melting at 195–198° C.

A mixture of 1.366 g. of the thus-obtained crude iodo compound, 5 g. of silver bifluoride and 50 ml. of acetonitrile was refluxed for one hour and worked up in the manner described above. There was thus-obtained 1.13 g. of 3α - hydroxy - 11 - keto - 16β - fluoro - 5β - pregn - 17(20)-[cis]-en-21-oic acid methyl ester 3-acetate.

Following the procedure of Example 9, other loweralkyl esters of 3,11-diketo-16α-bromo-5β-pregn-17(20)-[cis]-en-21-oic acid and the lower-alkyl esters of 3,11-diketo - 16α - bromo - 5α - pregn - 17(20) - [cis] - en-21-oic acid, e.g., the methyl, ethyl, propyl, butyl, octyl ester, are converted via the corresponding 16-iodo compound to the corresponding lower-alkyl ester of 3,11-diketo - 16β - fluoro - 5β - pregn - 17(20) - [cis] - en-21-oic acid and of 3,11-diketo-16β-fluoro-5α-pregn-17(20)-[cis]-en-21-oic acid, respectively. Similarly, the compounds of Examples 1–3 are concerted to the corresponding 16β-fluoro compounds by reaction with sodium iodide in acetone followed by reaction of the thus-produced 16α-iodo compounds with silver bifluoride in acetonitrile.

EXAMPLE 10

*3α-Hydroxy-11-Keto-16β-Fluoro-5β-Pregn-17(20)-[cis]-en-21-oic Acid Methyl Ester*

A solution of 1.08 g. of the 3α-hydroxy-11-keto-16β-fluoro-5β-pregn-17(20)-[cis]-en-21-oic acid methyl ester 3-acetate, obtained according to the procedure of Example 9, in 50 ml. of methanol and 1 ml. of boron trifluoride etherate was refluxed for one hour. The solution was cooled to room temperature, evaporated to 5 ml. at reduced pressure and then diluted to 100 ml. with ice and water. After two hours at 5° C. the precipitate was collected, washed well with water and dried at reduced pressure to give 0.917 g. of 3α-hydroxy-11-keto-16β-fluoro-5β-pregn-17(20)-[cis]-en-21-oic acid methyl ester.

Following the procedure of Example 10, other loweralkyl ester 3-acylates of 3α-hydroxy-11-keto-16β-fluoro-5β-pregn-17(20)-[cis]-en-21-oic acid, e.g., methyl ester 3-propionate, methyl ester 3-octanoate, ethyl ester 3-acetate, ethyl ester 3-propionate, ethyl ester 3-octanoate, are converted to the corresponding lower-alkyl ester of 3α-hydroxy-11-keto-16β-fluoro-5β-pregn-17(20)-[cis]-en-21 - oic acid.

EXAMPLE 11

*3,11-Diketo-16β-Fluoro-5β-Pregn-17(20)-[cis]-en-21-oic Acid Methyl Ester*

A solution of 0.917 g. of 3α-hydroxy-11-keto-16β-fluoro-5β-pregn-17(20)-[cis]-en-21-oic acid methyl ester, obtained according to the procedure of Example 10, in 12 ml. of acetone was cooled to 10° C. and 0.65 ml. of 4 N chromium trioxide in sulfuric acid and water was added. After 15 minutes the mixture was diluted with 100 ml. of ice water and then maintained overnight at 5° C. The resulting precipitate was collected, washed with water and dried to give 0.836 g. of 3,11-diketo-16β-fluoro-5β-pregn-17(20)-[cis]-en-21-oic acid methyl ester. This compound was converted to its 3-ethylene ketal in the manner described hereinafter and then hydrolyzed with dilute sulfuric acid in acetone to the free 3-ketone to give 0.486 g. of crystals thereof melting at 157–159° C.

Following the procedure of Example 11, other loweralkyl esters of 3α-hydroxy-11-keto-16β-fluoro-5β-pregn-17(20)-[cis]-en-21-oic acid, e.g., ethyl, propyl, butyl, octyl ester, are oxidized to the corresponding lower-alkyl ester of 3,11-diketo-16β-fluoro-5β-pregn-17(20)-[cis]-en-21-oic acid.

EXAMPLE 12

*3β-Hydroxy-11-Keto-16β-Fluoro-5α-Pregn-17(20)-[cis]-en-21-oic Acid Methyl Ester*

To a solution of 3.46 g. of 3β-hydroxy-11-keto-16β-fluoro-5α-pregn-17(20)-[cis]-en-21-oic acid methyl ester 3-acetate in 70 ml. of methylene chloride and 200 ml. of methanol was added 7.0 ml. of boron trifluoride etherate. The mixture was maintained at room temperature for 22 hours and then diluted with 900 ml. of ice water. The resulting precipitate was collected and dried to give 3.04 g. of 3β - hydroxy - 11-keto-16β-fluoro-5α-pregn-17(20)-[cis]-en-21-oic acid methyl ester.

Following the procedure of Example 12, other loweralkyl ester 3-acylates of 3β-hydroxy-11-keto-16β-fluoro-5α-pregn-17(20)-[cis]-en-21-oic acid, e.g., methyl ester 3-propionate, methyl ester 3-octanoate, ethyl ester 3-acetate, ethyl ester 3-propionate, ethyl ester 3-octanoate, are converted to the corresponding lower-alkyl ester of 3β-hydroxy - 11 - keto - 16β-fluoro-5α-pregn-17(20)-[cis]-en-21-oic acid.

EXAMPLE 13

*3,11-Diketo-16β-Fluoro-5α-Pregn-17(20)-[cis]-en-21-oic Acid Methyl Ester*

The 3β - hydroxy - 11-keto-16β-fluoro-5α-pregn-17(20)-[cis]-en-21-oic acid methyl ester obtained according to the procedure of Example 12 was dissolved in 150 ml. of acetone and cooled to 10° C., 2.3 ml. (1.1 mol. eq.) of a solution prepared from 26.7 g. of chromic oxide and 26 ml. of sulfuric acid diluted to 100 ml. with water was added and the mixture was stirred for 15 minutes with cooling. The reaction mixture was poured into 1,800 ml. of ice water which was then maintained at 5° C. for 24 hours. The resulting precipitate was collected, washed thoroughly with water and dried to give 2.75 g. of 3,11-diketo - 16β - fluoro-5α-pregn-17(20)-[cis]-en-21-oic acid methyl ester. Crysatllizations from mixtures of acetone and hexanes and from acetonitrile and water gave 2.5 g. of crystals thereof melting at 209-213° C. An analytical sample thereof, obtained by a further crystallization from a mixture of acetonitrile and water, melted at 213–214° C., λ max. 214 mμ, E=14,400, and had infrared absorption spectrum bands (Nujol) at 1705 and 1660 cm.$^{-1}$.

Following the procedure of Example 13, other loweralkyl esters of 3β-hydroxy-11-keto-16β-fluoro-5α-pregn-17(20)-[cis]-en-21-oic acid, e.g., ethyl, propyl, butyl, octyl ester, are oxidized to the corresponding lower-alkyl ester of 3,11-diketo-16β-fluoro-5α-pregn-17(20)-[cis]-en-21-oic acid.

EXAMPLE 14

*3,11-Diketo-16β-Fluoro-5α-Pregn-17(20)-[cis]-en-21-oic Acid Methyl Ester 3-Ethylene Ketal*

A solution of 1.42 g. of 3,11-diketo-16β-fluoro-5α-pregn-17(20)-[cis]-en-21-oic acid methyl ester, 2 ml. of ethylene glycol and 50 mg. of p-toluenesulfonic acid in 200 ml. of benzene was refluxed with azeotropic removal of water for 3 hours. The solution was then cooled to 40° C. and 0.2 ml. of pyridine was added. The cooled solution was washed with water, dried and the solvent removed at reduced pressure. There was obtained, after one crystallization from a mixture of benzene and hexanes, 1.32 g. of 3,11-diketo-16β-fluoro-5α-pregn-17(20)-[cis]-en-21-oic acid methyl ester 3-ethylene ketal melting at 255–260° C.

Following the procedure of Example 14, other loweralkyl esters of 3,11-diketo-16β-fluoro-5α-pregn-17(20)-[cis]-en-21-oic acid, e.g., ethyl, propyl, butyl, octyl ester, are converted to the corresponding 3-ethylene ketal thereof.

Substituting another lower-alkylene α- or β-glycol for the ethylene glycol in the reaction, e.g., propylene glycol, trimethylene glycol, butylene-2,3-glycol, produces the corresponding 3-lower-alkylene glycol of 3,11-diketo-16β-fluoro-5α-pregn-17(20)-[cis]-en-21-oic acid methyl ester. Other lower-alkyl esters are similarly converted to their 3-lower-alkylene ketals.

EXAMPLE 15

3,11-Diketo-16β-Fluoro-5β-Pregn-17(20)-[cis]-en-21-oic Acid Methyl Ester 3-Eethylene Ketal A solution of 1.43 g. of 3,11-diketo-16β-fluoro-5β-pregn-17(20)-[cis]-en-21-oic acid methyl ester, 3 ml. of ethylene glycol and 70 mg. of p-toluenesulfonic acid in 60 ml. of benzene was refluxed for 5½ hours with azeotropic removal of water. The product was worked up in the manner described in Example 14 to give, after crystallization from a mixture of acetone and hexanes, 1.11 g. of 3,11 - diketo - 16β-fluoro-5β-pregn-17(20)-[cis]-en-21-oic acid methyl ester 3-ethylene ketal melting at 222–223° C. Further crystallization from the same solvent mixture gave an analytical sample melting at 223–225° C.

Following the procedure of Example 15, other lower-alkyl esters of 3,11-diketo-16β-fluoro-5β-pregn-17(20)-[cis]-en-21-oic acid, e.g., ethyl propyl, butyl, octyl ester, are converted to the corresponding 3-ethylene ketal thereof.

Substituting another lower-alkylene α- or β-glycol for the ethylene glycol in the reaction, e.g., propylene glycol, trimethylene glycol, butylene-2,3-glycol, produces the corresponding lower-alkylene glycol. Other lower-alkyl esters are similarly converted to their 3-lower-alkylene ketals.

EXAMPLE 16

11β,21-Dihydroxy-16β-Fluoro-5βPregn-17(20)-[en]-3-one and 3-Ethylene Ketal and 21-Acetate Thereof A solution of 0.908 g. of 3,11-diketo-16β-fluoro-5β-pregn-17(20)-[cis]-en-21-oic acid methyl ester 3-ethylene ketal in 50 ml. of tetrahydrofuran was added over a 15 minute period at −10° C. to 0.122 equivalents of monomethoxylithium aluminum hydride in 85 ml. of tetrahydrofuran. The mixture was stirred for 2 hours at 0° C. and then ethyl acetate followed by water were cautiously added. The solids were filtered and washed thoroughly with hot ethyl acetate. The filtrate was evaporated, leaving a residue of 11β,21-dihydroxy-16β-fluoro-5β-pregn-17(20)-[en]-3-one 3-ethylene ketal.

The thus-produced 3-ethylene ketal was dissolved in 50 ml. of acetone, 5 ml. of 5% sulfuric acid was added and the solution was maintained for 18 hours at room temperature and then diluted with water. The mixture was adjusted to ph 6 and then concentrated at reduced pressure. The concentrate was extracted with methylene chloride which was then dried and evaporated to give a 0.62 g. residue of 11β,21-dihydroxy-16β-fluoro-5β-pregn-17(20)-[cis]-en-3-one.

The thus-produced compound was acetylated at room temperature for 18 hours with 4 ml. of acetic anhydride and 2 ml. of pyridine. The mixture was then flooded with ice water and the precipitated steroid separated, washed with water, dilute hydrochloric acid, aqueous sodium bicarbonate, water and dried to give 0.618 g. of 11β,21-dihydroxy-16β-fluoro-5β-pregn-17(20)- [cis]-en-3-one 21-acetate which was chromatographed on 25 g. of magnesium silicate. The column was developed with 50-ml. portions of hexanes containing 10% acetone. Fractions 3–8 contained 543 mg. of the desired product having infrared absorption bands at 3620, 3520, 1740, 1728, 1712 and 1240 cm.$^{-1}$.

Following the procedure of Example 16, other lower-alkyl esters of 3,11-diketo-16β-fluoro-5β-pregn-17(20)-[cis]-en-21-oic acid 3-ethylene ketal, e.g., the ethyl, propyl, butyl, or octyl ester, are also converted to the 3-ethylene ketal of 11β,21-dihydroxy-16β-fluoro-5β-pregn-17(20)-[cis]-en-3-one.

Substituting another 3-lower-alkylene ketal of lower-alkyl esters of 3,11-diketo-16β-fluoro-5β-pregn-17(20)-[cis]-en-21-oic acid, e.g., ethylene ketal ethyl ester, ethylene ketal octyl ester, trimethylene ketal methyl ester, trimethylene ketal ethyl ester, propylene ketal methyl ester, propylene ketal ethyl ester, for the 3-ethylene ketal methyl ester of 3,11-diketo-16β-fluoro-5β-pregn-17(20)-[cis]-en-21-oic acid, there is produced the corresponding lower-alkylene ketal of 11β,21-dihydroxy-16β-fluoro-5β-pregn-17(20)-[cis]-en-3-one. Each of the above lower-alkylene ketals are hydrolyzed in the same manner as the 3-ethylene ketal to produce 11β,21-dihydroxy-16β-fluoro-5β-pregn-17(20)-[cis]-en-3-one.

Similarly, 11β,21-dihydroxy-16β - fluoro - 5β - pregn-17(20)-[cis]-en-3-one is converted to other 21-acylates thereof by esterification of the 21-hydroxy groups, e.g., by reaction with the appropriate acid anhydride, acid chloride or bromide, ester by ester exchange, acid in the presence of an esterification catalyst, etc. Examples of the 21-acylates thus prepared include those wherein the acyl group is the acyl radical of, for example, a lower-aliphatic acid, e.g., formic, propionic, butyric, isobutyric, valeric, isovaleric, trimethylacetic, 2-methylbutyric, 3-ethylbutyric, hexanoic, diethylacetic, triethylacetic, heptanoic, octanoic, α-ethyl-isovaleric, a cyclic acid, e.g., cyclopropylideneacetic, a cycloaliphatic acid, e.g., cyclopentylformic, cyclopentylacetic, β-cyclopentylpropionic, cyclohexylformic, cyclohexylacetic, β - cyclohexylpropionic, an aryl or alkaryl acid, e.g., benzoic, 2, 3, or 4-methylbenzoic, 2,3-, 2,4-, 2,5-, 2,6-, 3,4- and 3,5-dimethylbenzoic, ethylbenzoic, 2,4,6-trimethyl-benzoic, 2,4,6-triethylbenzoic, α-naphthoic, 3-methyl-α-naphthoic, an aralkyl acid, e.g., phenylacetic, phenylpropionic, diphenylacetic, triphenylacetic, a dibasic acid (which can be converted to water soluble, e.g., sodium, salts), e.g., succinic, glutaric, α-methylglutaric, β-methylglutaric, β,β-dimethylglutaric, adipic, pimelic and suberic acid.

EXAMPLE 17

11β,21-Dihydroxy-16β-Fluoro-5α-Pregn-17(20)-[cis]-en-3-one and 3-Ethylene Ketal and 3-Acetate Thereof A solution of 2.56 g. of 3,11-diketo-16β-fluoro-5α-pregn-17(20)-[cis]-en-21-oic acid methyl ester 3-ethylene ketal in 100 ml. of tetrahydrofuran was added over a 10-minute period to a stirred suspension of 2.7 g. of lithium aluminum hydride in 400 ml. of tetrahydrofuran at 0° C. Stirring was continued at ice-bath temperature and the mixture was decomposed by the cautious addition of 7 ml. of water. The mixture was filtered and the filter cake was washed thoroughly with hot ethyl acetate. The filtrate was evaporated to give 2.07 g. of 11β,21-dihydroxy - 16β - fluoro-5α-pregn-17(20)-[cis]-en-3-one 3-ethylene ketal melting at 160–173° C.

The thus-obtained ketal was dissolved in 150 ml. of acetone and 15 ml. of 3% sulfuric acid was added. The solution was maintained overnight at room temperature and then neutralized with aqueous sodium bicarbonate. The acetone was evaporated at reduced pressure and the product extracted with methylene chloride which was then washed with water and dried. The solvent was removed at reduced pressure to give a residue of 11β,21-dihydroxy-16β-fluoro-5α-pregn-17(20)-[cis]-en-3-one.

This product was maintained in a mixture of 5 ml. of acetic anhydride and 7 ml. of pyridine at room temperature for 20 hours. The mixture was then poured into 500 ml. of ice water and the resulting precipitate was collected, dissolved in methylene chloride, washed with water, dilute hydrochloric acid, aqueous sodium bicarbonate, water and then dried to give 2.02 g. of 11β,21-dihydroxy-16β-fluoro - 5α-pregn-17(20)-[cis]-en-3-one 21-acetate. An analytical sample thereof melting at 137–139° C. was obtained by crystallization from a mixture of acetone and hexanes.

Following the procedure of Example 17, other lower-alkyl esters of 3,11-diketo-16β-fluoro-5α-pregn-17(20)-[cis]-en-21-oic acid 3-ethylene ketal, e.g., the ethyl, propyl, butyl, or octyl ester, are also converted to the 3-ethylene ketal of 11β,21-dihydroxy-16β-fluoro-5α-pregn-17(20)-[cis]-en-3-one.

Substituting other 3-lower-alkylene ketals of loweralkyl esters of 3,11-diketo-16β-fluoro-5α-pregn-17(20)-[cis]-en-21-oic acid, e.g., ethylene ketal ethyl ester, ethylene ketal octyl ester, trimethylene ketal methyl ester, trimethylene ketal ethyl ester, propylene ketal methyl ester, propylene ketal ethyl ester, for the 3-ethylene ketal methyl ester of 3,11-diketo-16β-fluoro-5α-pregn-17(20)-[cis]-en-21-oic acid, there is produced the corresponding lower-alkylene ketal of 11β,21-dihydroxy-16β-fluoro-5α-pregn-17(20)-[cis]-en-3-one. Each of the above lower-alkylene ketals are hydrolyzed in the same manner as the ethylene ketal to produce 11β,21-dihydroxy-16β-fluoro-5α-pregn-17(20)-[cis]-3-one.

Similarly, 11β,21 - dihydroxy - 16β - fluoro - 5α - pregn-17(20)-[cis]-en-3-one is converted to other 21-acylates thereof by esterification of the 21-hydroxy group with the appropriate acid anhydride, acid chloride or bromide, ester by ester exchange, acid in the presence of an esterification catalyst, etc. to produce 21-acylates wherein the acyl radical is, for example, that of an acid named in the paragraph following Example 16.

EXAMPLE 18

*11β,17α,21-Trihydroxy-16β-Fluoro-5α-Pregnane-3,20-Dione 21-Acetate*

To a solution of 0.474 g. of crude 11β,21-dihydroxy-16β - fluoro-5α-pregn-17(20)-[cis]-en-3-one 21-acetate in 25 ml. of tertiary butyl alcohol was added 0.3 ml. of pyridine, 5.2 molar equivalents of N-methylmorpholine oxide peroxide and 13 mg. of osmium tetroxide in 6 ml. of tertiary butyl alcohol. After 20 hours at room temperature, 30 ml. of 0.5 percent aqueous sodium hydrosulfite was added and the mixture was stirred for 30 minutes. The solution was concentrated at reduced pressure and extracted with methylene chloride. The extracts were washed with a brine solution and dried. The solvent was evaporated and the residue redissolved in 10 ml. of methylene chloride which was poured over a magnesium silicate (Florisil) chromatographic column. The column was developed with 50-ml. portions of hexanes containing increasing portions of acetone, viz. 10 with 5% acetone, 20 with 10% acetone and 20 with 15% acetone. The last 10 50-ml. eluate portions with 10% acetone and the first three with 15% acetone eluted 11β,17α,21-trihydroxy-16β - fluoro - 5α - pregnane - 3,20-dione 21-acetate which, when crystallized from a mixture of acetone and water, melted at 184–186° C. An analytical sample obtained by recrystallization from a mixture of acetone and hexanes melted at 190–193° C.

Similarly, other 21-acylates of 11β,21-dihydroxy-16β-fluoro-5α-pregn-17(20)-[cis]-en-3-one, e.g., wherein the acyl radical thereof is that of an acid named in the paragraph following Example 16, are converted to the corresponding 21 - acylate of 11β,17α,21 - trihydroxy - 16β-fluoro-5α-pregnane-3,20-dione.

EXAMPLE 19

*11β,17α,21-Trihydroxy-16β-Fluoro-5β-Pregnane-3,20-Dione 21-Acetate*

To a solution of 0.543 g. of 11β,21-dihydroxy-16β-fluoro-5β-pregn-17(20)-[cis]-en - 3 - one 21-acetate in 36 ml. of tertiary butyl alcohol was added 0.8 ml. of pyridine, 3.0 mol. eq. of N-methylmorpholine oxide peroxide and 4.7 mg. of osmium tetroxide in 1.5 ml. of tertiary butyl alcohol. The stirred mixture was maintained at room temperature for 19 hours and to it was then added 50 ml. of 0.5 percent aqueous sodium hydrosulfite. The mixture was then concentrated at reduced pressure to 15 ml. and extracted with methylene chloride. The extracts were washed with a brine solution, dried and evaporated to dryness. The residue was redissolved in 15 ml. of methylene chloride and chromatographed on a 25 g. column of magnesium silicate. The column was developed with 50-ml. portions of hexanes containing 10% acetone. Fractions 8–23 were freed of solvent to give 11β,17α,21-trihydroxy-16β - fluoro - 5β - pregnane - 3,20-dione 21-acetate.

Similarly, other 21-acylates of 11β,21-dihydroxy-16β-fluoro-5β-pregn-17(20)-[cis]-en-3-one, e.g., wherein the acyl radical is that of an acid named in the paragraph following Example 16, are converted to the corresponding 21-acylate of 11β,17α,21-trihydroxy-16β - fluoro - 5β-pregnane-3,20-dione.

*11β,17α,21-Trihydroxy-16β-Fluoro-4-Pregnene-3,20-Dione 21-Acetate*

0.02 ml. of bromine was added over a 30 second period to a solution of 0.145 g. of 11β,17α,21-trihydroxy-16β-fluoro-5β-pregnane-3,20-dione 21-acetate in 6 ml. of purified dioxane containing 5 mg. of p-toluenesulfonic acid monohydrate. After 3 minutes the solution was diluted with aqueous sodium bicarbonate to 125 ml. and cooled for 1 hour at 5° C. The 70 mg. of precipitated 4-bromo-11β,17α,21-trihydroxy-16β - fluoro - 5β - pregnane - 3,20-dione 21-acetate was separated and dried. Extraction of the mother liquors gave an additional 100 mg. of the same product.

A mixture of the 170 mg. of the thus-obtained 4-bromo compound, 120 mg. of semicarbazide hydrochloride, 120 mg. of sodium acetate and 31 ml. of 98% acetic acid was heated at 40–90° C. under nitrogen for 2 hours. The thus-obtained solution of 3-semicarbazide of 11β,17α,21-trihydroxy-16β-fluoro-4-pregnene - 3,20-dione 21-acetate was decomposed by adding 1.75 ml. of pyruvic acid in 3.5 ml. of water thereto and continuing the heating for 1.5 hours at 60–90° C. The solution was then cooled, diluted with 200 ml. of ethyl acetate and extracted with ice cold 1 N aqueous sodium hydroxide. The ethyl acetate layer was dried and then evaporated to give a residue of 11β,17α,21-trihydroxy-16β-fluoro - 4 - pregnene - 3,20-dione 21-acetate which, when purified by chromatography on magnesium silicate in the manner described hereinbefore and then crystallized from a mixture of acetone and hexanes, melted at 145–154° C. Two more crystallizations from the same solvent pair gave crystals thereof melting at 160–162° C. An analytical sample melted at 160–161° C. with λ max. 241 mμ, E=15,750, and infrared absorption bands at 3515, 3280, 1745, 1734, 1629, and 1243 cm.$^{-1}$.

Similarly, other 21-acylates of 11β,17α,21-trihydroxy-16β-fluoro-5β-pregnane-3,20-dione, e.g., wherein the acyl radical is that of an acid named in the paragraph following Example 16, are converted to the corresponding 21-acylate of 11β,17α,21-trihydroxy - 16β - fluoro-4-pregnene-3,20-dione.

*11β,17α,21-Trihydroxy-16β-Fluoro-1,4-Pregnadiene-3,20-Dione 21-Acetate*

A solution of 104 mg. of 11β,17α,21-trihydroxy-16β-fluoro-5α-pregnane-3,20-dione 21-acetate, 64 mg. of selenium dioxide, 0.06 ml. of acetic acid and 7 ml. of tertiary butyl alcohol was refluxed for 24 hours under nitrogen. An additional 60 mg. of selenium dioxide was added and refluxing was continued for another 24 hours. The cooled solution was then filtered and evaporated to dryness at reduced pressure. The residue was taken up in methylene chloride which was then washed with water, aqueous lead acetate, water, aqueous sodium bicarbonate and water. The dried solution was chromatographed in magnesium silicate. Elution with hexanes containing increasing amounts of acetone eluted 11β,17α,21-trihydroxy-16β-fluoro-1,4-pregnadiene-3,20-dione 21-acetate which, when crystallized twice from a mixture of acetone and hexanes, melted at 172–173° C. and exhibited λmax. 243 mμ, E=15,400. An analytical sample melted 176–178° C. and had infrared absorption bands at 3420, 3360, 1750, 1735, 1726, 1655, 1615, 1600, and 1587 cm.$^{-1}$.

Similarly, other 21-acylates of 11β,17α,21-trihydroxy-16β-fluoro-5α-pregnane-3,20-dione, e.g., wherein the acyl radical is that of an acid named in the paragraph following Example 16, are converted to the corresponding 21-acylate of 11β,17α,21-trihydroxy-16β-fluoro-1,4-pregnadiene-3,20-dione.

Substituting a 21-acylate of 11β,17α,21-trihydroxy-16β-fluoro-4-pregnene-3,20-dione, e.g., the 21-acetate or one whose acyl radical is that of an acid named in the paragraph following Example 16, as the starting compound in the dehydrogenation reaction described above is also productive of the corresponding 21-acylate of 11β,17α,21-trihydroxy-16β-fluoro-1,4-pregnadiene-3,20-dione.

*9α,16β-Difluoro-11β,17α-21-Trihydroxy-1,4-Pregnadiene-3,20-Dione 21-Acetate*

0.6 g. of N-bromoacetamide was added to 1.16 g. of 11β,17α,21-trihydroxy-16β-fluoro-1,4-pregnadiene-3,20-dione 21-acetate in 25 ml. of pyridine. The solution was cooled to 10° C. and sulfur dioxide was passed over the surface for 10 minutes. The solution was poured into 450 ml. of ice water and, after one hour at 5° C., the precipitated 16β-fluoro-17α,21-dihydroxy-1,4,9(11)-pregnatriene-3,20-dione 21-acetate was collected and dried.

To a solution of the thus-obtained product in 15 ml. of methylene chloride and 25 ml. of tertiary butyl alcohol was added 0.32 ml. of 70% perchloric acid in 2.5 ml. of water and 0.45 g. of N-bromoacetamide in 5 ml. of tertiary butyl alcohol. The mixture was stirred for 10 minutes at 25–28° C. and 0.5 g. of sodium sulfite in 5 ml. of water was added thereto. The resulting solution was concentrated at reduced pressure to 30 ml. The thus-produced 9α-bromo-11β,17α,21-trihydroxy-16β-fluoro-1,4-pregnadiene-3,20-dione 21-acetate was precipitated therefrom by the slow addition of 200 ml. of ice water, collected and dried.

The thus-produced 9α-bromo compound was dissolved in 30 ml. of acetone and the solution was refluxed for 6.5 hours in the presence of 1.2 g. of potassium acetate. The acetone was then removed at reduced pressure and the steroidal product extracted with methylene chloride. The extracts were washed with water, dried and the thus-produced 9β,11β-epoxy-17α,21-dihydroxy-16β-fluoro-1,4-pregnadiene-3,20-dione 21-acetate was purified by chromatography on a column of magnesium silicate developed with hexanes containing increasing amounts of acetone. Crystallization from a mixture of acetone and hexanes gave an analytical sample thereof melting at 152–153° C.

A solution of 0.155 g. of the thus-obtained 9β,11β-oxide in 2 ml. of methylene chloride was cooled to —60° C. and then added to a solution of 1.62 g. of hydrogen fluoride in dry tetrahydrofuran at —60° C. The solution was maintained at 5° C. for 18 hours and then poured into a solution of 12 g. of sodium bicarbonate in 120 ml. of ice water. The resulting mixture was extracted with methylene chloride and the extracts were dried and evaporated. The residual 9α,16β-difluoro-11β,17α,21-trihydroxy-1,4-pregnadiene-3,20-dione 21-acetate was crystallized from a mixture of acetone and hexanes to give an analytical sample of the acetone solvate thereof melting at 110–115° C., λmax. 239 mμ, E=15,500, and infrared absorption bands at 3350, 1745, 1705, 1664, 1620, 1609, 1233, 1045, and 1014 cm.$^{-1}$.

Following the above procedure, 11β,17α,21-trihydroxy-16β-fluoro-4-pregene-3,20-dione 21-acetate and other 21-acylates of 11β,17α,21-trihydroxy-16β-fluoro-1,4-pregnadiene-3,20-dione and of 11β,17α,21-trihydroxy-16β-fluoro-4-pregnene-3,20-dione, e.g., wherein the acyl radical is that of an acid named in the paragraph following Example 16, are converted to 9α,16β-difluoro-11β,17α,21-trihydroxy-4-pregnene-3,20-dione 21-acetate and the corresponding acylates of 9α,16β-difluoro-11β,17α,21-trihydroxy-1,4-pregnadiene-3,20-dione and 9α,16β-difluoro-11β,17α,21-trihydroxy-4-pregnene-3,20-dione, respectively.

We claim:

1. A compound represented by the formula:

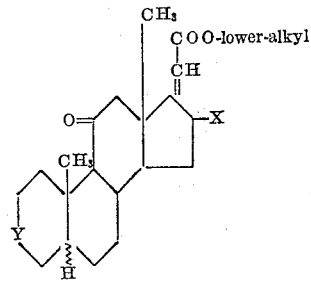

wherein Y is selected from the group consisting of hydroxy-methylene, lower-hydrocarbonacyloxymethylene, and carbonyl, and X is selected from the group consisting of α-bromo, α-iodo and β-fluoro and when Y is hydroxymethylene and lower-hydrocarbonacyloxymethylene it has a stereoconfiguration opposite that of 5-H.

2. 3β-hydroxy-11-keto-16β-fluoro-5α-pregn-17(20)-[cis]-en-21-oic acid methyl ester 3-acetate.
3. 3α-hydroxy-11-keto-16β-fluoro-5β-pregn-17(20)-[cis]-en-21-oic acid methyl ester 3-acetate.
4. 3β-hydroxy-11-keto-16β-fluoro-5α-pregn-17(20)-[cis]-en-21-oic acid methyl ester.
5. 3α-hydroxy-11-keto-16β-fluoro-5β-pregn-17(20)-[cis]-en-21-oic acid methyl ester.
6. 3,11-diketo-16β-fluoro-5α-pregn-17(20)-[cis]-en-21-oic acid methyl ester.
7. 3,11-diketo-16β-fluoro-5β-pregn-17(20)-[cis]-en-21-oic acid methyl ester.

8. A compound represented by the formula:

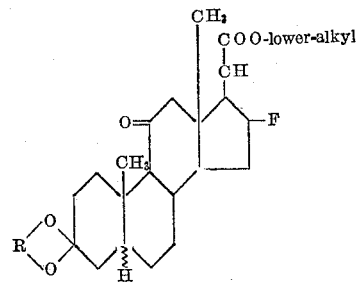

where in R is a lower-alkylene radical containing from 2 to 3 carbon atoms, in the oyxgen to oxygen chain.

9. 3,11-diketo-16β-fluoro-5α-pregn-17(20)-[cis]-en-21-oic acid methyl ester 3-ethylene ketal.
10. 3,11-diketo-16β-fluoro-5β-pregn-17(20)-[cis]-en-21-oic acid methyl ester 3-ethylene ketal.
11. A compound selected from the group consisting of (1) those represented by the formula:

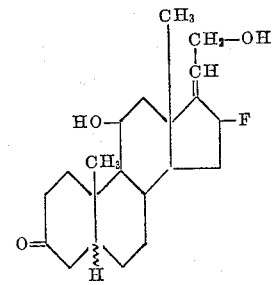

(2) 3-lower-alkylenedioxy cyclic ketals thereof, and (3) 21-lower-hydrocarbonacyloxy esters thereof.

12. 11β,21-dihydroxy-16β-fluoro-5α-pregn-17(20)-[cis]-en-3-one 3-ethylene ketal.
13. 11β,21-dihydroxy-16β-fluoro-5β-pregn-17(20)-[cis]-en-3-one 3-ethylene ketal.
14. 11β,21-dihydroxy-16β-fluoro-5α-pregn-17(20)-[cis]-en-3-one.

15. 11β,21 - dihydroxy - 16β - fluoro-5β-pregn-17(20)-[cis]-en-3-one.

16. 11β,21 - dihydroxy - 16β - fluoro-5α-pregn-17(20)-[cis]-en-3-one 21-acetate.

17. 11β,21 - dihydroxy - 16β - fluoro-5β-pregn-17(20)-[cis]-en-3-one 21-acetate.

18. A compound represented by the formula:

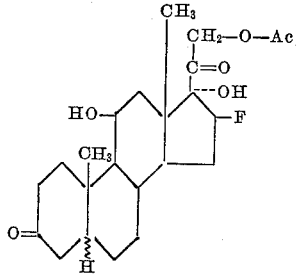

wherein AC is the acyl radical of a lower-hydrocarbon carboxylic acid.

19. 11β,17α,21 - trihydroxy - 16β - fluoro-5α-pregnane-3,20-dione 21-acetate.

20. 11β,17α,21 - trihydroxy - 16β - fluoro-5β-pregnane-3,20-dione 21-acetate.

References Cited in the file of this patent
UNITED STATES PATENTS

| | | |
|---|---|---|
| 2,781,366 | Schneider | Feb. 12, 1957 |
| 2,867,635 | Lincoln et al. | Jan. 6, 1959 |
| 2,895,972 | Fried et al. | July 21, 1959 |

UNITED STATES PATENT OFFICE
CERTIFICATE OF CORRECTION

Patent No. 3,027,383            March 27, 1962

Donald E. Ayer et al.

It is hereby certified that error appears in the above numbered patent requiring correction and that the said Letters Patent should read as corrected below.

Column 7, line 26, after "-21-oic" insert -- acid --; column 9, line 20, for "concerted" read -- converted --; column 13, line 12, for "-[cis]-3-one" read ---[cis]-en-3-one --; column 16, lines 37 to 47, the formula should appear as shown below instead of as in the patent:

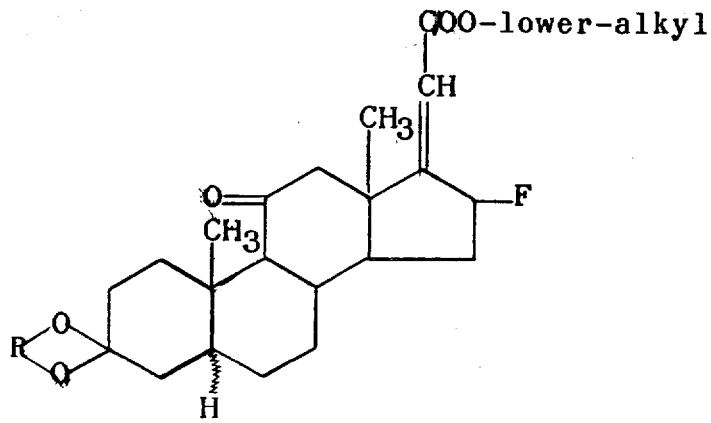

Signed and sealed this 24th day of July 1962.

(SEAL)
Attest:

ERNEST W. SWIDER            DAVID L. LADD

Attesting Officer            Commissioner of Patents